(12) United States Patent
Surjaatmadja et al.

(10) Patent No.: US 7,429,332 B2
(45) Date of Patent: *Sep. 30, 2008

(54) SEPARATING CONSTITUENTS OF A FLUID MIXTURE

(75) Inventors: Jim B. Surjaatmadja, Duncan, OK (US); Timothy H. Hunter, Duncan, OK (US)

(73) Assignee: Halliburton Energy Services, Inc., Houston, TX (US)

(*) Notice: Subject to any disclaimer, the term of this patent is extended or adjusted under 35 U.S.C. 154(b) by 314 days.

This patent is subject to a terminal disclaimer.

(21) Appl. No.: 11/119,956

(22) Filed: May 2, 2005

(65) Prior Publication Data

US 2006/0000608 A1    Jan. 5, 2006

Related U.S. Application Data

(63) Continuation-in-part of application No. 10/881,223, filed on Jun. 30, 2004.

(51) Int. Cl.
 *B01D 17/025* (2006.01)

(52) U.S. Cl. .................. 210/799; 210/801; 210/804; 210/170.01; 210/256; 210/299; 210/519; 210/532.1; 210/540; 210/DIG. 5

(58) Field of Classification Search ............. 210/747, 210/799, 800, 801, 804, 253, 254, 256, 170.01, 210/DIG. 5, 299, 265, 538, 540, 532.1, 519
See application file for complete search history.

(56) References Cited

U.S. PATENT DOCUMENTS

| | | | |
|---|---|---|---|
| 1,618,151 A | 2/1927 | Fisher | |
| 1,743,179 A | 1/1930 | Zeb | |
| 2,206,835 A * | 7/1940 | Combs | 210/540 |
| 2,760,635 A | 8/1956 | Dahlstrom | |
| 2,917,173 A | 12/1959 | Rakowsky | |
| 2,946,439 A | 7/1960 | Condolios et al. | |
| 3,862,039 A * | 1/1975 | Summers | 210/170.01 |
| 4,216,095 A | 8/1980 | Ruff | |

(Continued)

FOREIGN PATENT DOCUMENTS

GB   2 326 895   1/1999

(Continued)

OTHER PUBLICATIONS

S.P. Engel and Phil Rae, "New Methods for Sand Cleanout in Deviated Wellbores Using Small Diameter Coiled Tubing," IADC/SPE 77204, Society of Petroleum Engineers, Copyright 2002, 6 pages.

(Continued)

*Primary Examiner*—Christopher Upton
(74) *Attorney, Agent, or Firm*—Paul Morico

(57) ABSTRACT

A device for separating constituents of a fluid mixture includes an elongate vessel oriented at an acute angle to horizontal. The vessel is operable to receive the fluid mixture and direct the fluid mixture to flow in a convection cell spanning substantially a length of the vessel. The convection cell is formed by gravitational forces acting on the fluid mixture and is operable to deposit a heavy constituent of the fluid mixture about a lower end of the vessel and a light constituent of the fluid mixture about an upper end of the vessel.

26 Claims, 5 Drawing Sheets

U.S. PATENT DOCUMENTS

| | | | |
|---|---|---|---|
| 4,241,787 A | 12/1980 | Price | 166/105 |
| 4,271,010 A | 6/1981 | Guarascio | |
| 4,296,810 A | 10/1981 | Price | 166/265 |
| 4,818,375 A | 4/1989 | Dorph | |
| 4,886,599 A * | 12/1989 | Bachmann et al. | 210/DIG. 5 |
| 4,938,878 A * | 7/1990 | Hall | 210/540 |
| 5,013,435 A * | 5/1991 | Rider et al. | 210/521 |
| 5,127,457 A | 7/1992 | Stewart et al. | 166/306 |
| 5,224,604 A | 7/1993 | Duczmal et al. | |
| 5,296,153 A | 3/1994 | Peachey | 210/787 |
| 5,336,396 A * | 8/1994 | Shetley | 210/253 |
| 5,425,416 A | 6/1995 | Hammeke et al. | 166/105.5 |
| 5,443,120 A | 8/1995 | Howell | |
| 5,456,837 A | 10/1995 | Peachey | 210/512.2 |
| 5,570,744 A | 11/1996 | Weingarten et al. | 166/357 |
| 5,597,493 A * | 1/1997 | Torini | 210/799 |
| 5,693,225 A | 12/1997 | Lee | 210/512.2 |
| 5,779,917 A | 7/1998 | Brister | |
| 5,837,152 A * | 11/1998 | Komistek et al. | 210/801 |
| 5,857,519 A | 1/1999 | Bowlin et al. | 166/105.6 |
| 5,899,270 A | 5/1999 | Watson | 166/105.5 |
| 5,961,841 A | 10/1999 | Bowers | 210/739 |
| 5,988,275 A | 11/1999 | Brady et al. | 166/105.5 |
| 5,992,521 A | 11/1999 | Bergren et al. | 166/265 |
| 5,996,690 A | 12/1999 | Shaw et al. | 166/250.01 |
| 6,015,011 A | 1/2000 | Hunter | 166/265 |
| 6,056,054 A | 5/2000 | Brady et al. | 166/265 |
| 6,068,053 A | 5/2000 | Shaw | 166/267 |
| 6,082,452 A | 7/2000 | Shaw et al. | 166/105.5 |
| 6,089,317 A | 7/2000 | Shaw | 166/265 |
| 6,099,742 A * | 8/2000 | Komistek | 210/540 |
| 6,131,655 A | 10/2000 | Shaw | 166/105.5 |
| 6,142,224 A | 11/2000 | Stuebinger et al. | 166/105.5 |
| 6,152,218 A | 11/2000 | Safargar | 166/105.5 |
| 6,173,774 B1 | 1/2001 | Fox | 166/265 |
| 6,189,613 B1 | 2/2001 | Chachula et al. | 166/265 |
| 6,196,312 B1 | 3/2001 | Collins et al. | 166/265 |
| 6,196,313 B1 | 3/2001 | Simons | 166/266 |
| 6,202,744 B1 | 3/2001 | Shaw | 166/106 |
| 6,209,641 B1 | 4/2001 | Stevenson | 166/266 |
| 6,277,286 B1 | 8/2001 | Sontvedt et al. | |
| 6,336,503 B1 | 1/2002 | Alhanati et al. | 166/265 |
| 6,336,504 B1 | 1/2002 | Alhanati et al. | 166/265 |
| 6,367,547 B1 | 4/2002 | Towers et al. | 166/265 |
| 6,379,567 B1 | 4/2002 | Crites | |
| 6,382,316 B1 | 5/2002 | Kintzele | 166/265 |
| 6,478,953 B2 * | 11/2002 | Spearman et al. | 210/254 |
| 6,543,537 B1 | 4/2003 | Kjos | 166/266 |
| 6,547,003 B1 | 4/2003 | Bangash et al. | 166/106 |
| 6,550,535 B1 | 4/2003 | Traylor | 166/265 |
| 6,627,081 B1 | 9/2003 | Hilditch et al. | 210/512.2 |
| 6,672,385 B2 | 1/2004 | Kilaas et al. | 166/250.01 |
| 6,691,781 B2 | 2/2004 | Grant et al. | 166/265 |
| 6,719,048 B1 | 4/2004 | Ramos et al. | 166/250.15 |
| 6,761,215 B2 | 7/2004 | Morrison et al. | 166/105.5 |
| 6,868,907 B2 | 3/2005 | Homstvedt et al. | 166/265 |
| 6,868,911 B1 | 3/2005 | Jacobson et al. | 166/369 |
| 6,880,402 B1 | 4/2005 | Couet et al. | 73/579 |
| 2002/0084073 A1 | 7/2002 | Underdown et al. | 166/265 |
| 2002/0153326 A1 | 10/2002 | Oddie | |
| 2002/0189807 A1 | 12/2002 | Emanuele et al. | 166/266 |
| 2003/0051874 A1 | 3/2003 | Munson et al. | 166/265 |
| 2003/0079876 A1 | 5/2003 | Underdown | 166/265 |
| 2003/0145991 A1 | 8/2003 | Olsen | 166/265 |
| 2004/0069494 A1 | 4/2004 | Olsen et al. | 166/357 |
| 2004/0104027 A1 | 6/2004 | Rossi et al. | 166/250.15 |
| 2004/0134654 A1 | 7/2004 | Snow | 166/265 |

FOREIGN PATENT DOCUMENTS

| | | |
|---|---|---|
| WO | WO 96/03566 | 2/1996 |
| WO | WO 97/25150 | 7/1997 |
| WO | WO 98/37307 | 8/1998 |
| WO | WO 98/41304 | 9/1998 |
| WO | WO 00/65197 | 11/2000 |
| WO | WO 01/23707 | 4/2001 |
| WO | WO 02/14647 | 2/2002 |
| WO | WO 03/062597 | 7/2003 |
| WO | WO 2004/053291 | 6/2004 |

OTHER PUBLICATIONS

Jim B. Surjaatmadja, "Well Intervention Using Coiled Tubing for Sweep-Cleaning Out of Deviated Wellbores and Accurate Placement of Multiple Fractures in Vertical and Deviated Wellbores," 10th European Coiled Tubing and Well Intervention Roundtable, International Coiled Tubing Association, Society of Petroleum Engineers, Nov. 16-17, 2004, 10 pages.

Surjaatmadja, et al., U.S. Patent Application entitled "Wellbore Completion Design to Naturally Separate Water and Solids From Oil and Gas," U.S. Appl. No. 10/881,223, filed Jun. 30, 2004 (26 pages).

Jim B. Surjaatmadja & R. Rosine, "An Effective Sweep—Cleaning of Large Deviated Wellbores Using Small Coiled-Tubing Systems", 2005 SPE/ICoTA Coiled Tubing Conference and Exhibition, Apr. 12-13, 2005, 8 Pages.

Office Action dated Aug. 25, 2006 for U.S. Appl. No. 10/881,223.

Final Office Action dated Feb. 22, 2007 for U.S. Appl. No. 10/881,223.

Advisory Action dated May 31, 2007 for U.S. Appl. No. 10/881,223.

Notice of Allowance dated Jul. 13, 2007 for U.S. Appl. No. 10/881,223.

Notice of Allowance and Fees Due dated Oct. 30, 2007 for U.S. Appl. No. 10/881,223.

International Search Report and Written Opinion dated Sep. 27, 2007 for application serial No. PCT/US2006/016724.

* cited by examiner

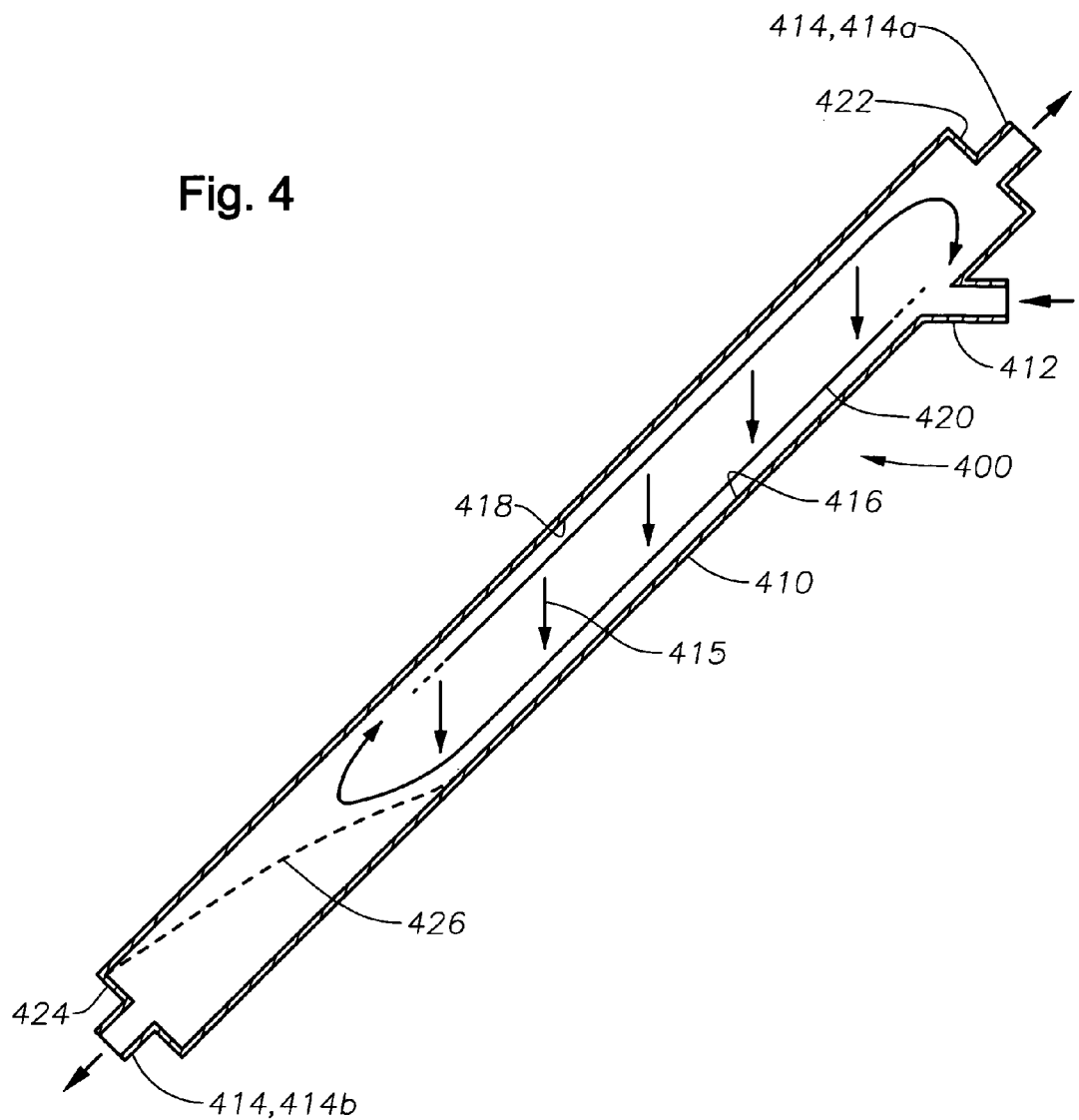

SEPARATING CONSTITUENTS OF A FLUID MIXTURE

CROSS REFERENCE TO RELATED APPLICATION

This application is a continuation-in-part of pending application Ser. No. 10/881,223 filed Jun. 30, 2004, the disclosure of which is incorporated herein by reference in its entirety.

BACKGROUND

This disclosure relates to separating constituents of a fluid mixture, and more particularly to systems and methods for separating constituents of a fluid mixture having disparate densities.

In many industries, there is a need to separate a fluid mixture into one or more of its constituents. For example, in producing hydrocarbons from a well, water and particulate solids, such as sand, are produced together with the hydrocarbons. It is not desirous to have either of these byproducts present in the hydrocarbons. Therefore, well operators have implemented numerous techniques to separate the water and sand from the produced hydrocarbons.

One conventional technique for removing sand from the hydrocarbons is to install sand screens in the production pipe inside the well bore. A sand screen is screen including one or more layers of mesh sized to prevent passage of sand into an interior of the screen. Sand screens have been used successfully for many years; however, like any filter, they are subject to clogging and plugging, for example, as the screen's mesh fills with sand and other particulate.

In the past, water has been filtered from the produced hydrocarbons or separated in a free-water knockout separator. Filters, like sand screens, are prone to clogging and plugging. Free-water knockout separators are large vessels that separate the water and hydrocarbons by allowing the water to settle vertically downward and out of the hydrocarbons. The separated water is subsequently withdrawn from the bottom of the vessel. Free-water knockout separators are generally slow at separating the water from hydrocarbons, because they rely on the water settling vertically downward and out of the hydrocarbons.

Accordingly, there is a need for improved systems and methods of separating constituents of a fluid mixture.

SUMMARY

The present disclosure is directed to systems, devices and methods for separating constituents of a fluid mixture.

One illustrative implementation encompasses a device for separating constituents of a fluid mixture. The device includes an elongate vessel oriented at an acute angle to horizontal. The vessel is operable to receive the fluid mixture and direct the fluid mixture to flow in a convection cell spanning substantially a length of the vessel. The convection cell is formed by gravitational forces acting on the fluid mixture and is operable to deposit a heavy constituent of the fluid mixture about a lower end of the vessel and a light constituent of the fluid mixture about an upper end of the vessel.

In some implementations, the device includes a second elongate vessel oriented at an acute angle to horizontal. The second vessel is operable to receive a fluid mixture and direct the fluid mixture to flow in a convection cell spanning substantially a length of the second vessel. The convection cell is formed by gravitational forces acting on the fluid mixture and is operable to deposit a heavy constituent of the fluid mixture about a lower end of the second vessel. The fluid mixture received by the second vessel can include either or both of a fluid mixture output from the first mentioned vessel or the fluid mixture provided to the first mentioned vessel can be split between the first mentioned vessel and the second vessel. The first and second elongate vessels can be nested to reduce the space required for the device.

Some implementations can incorporate a filter residing at least partially between the inlet and an outlet near the upper end or between the inlet and an outlet near the lower end. More than one filter can be provided, for example one between the inlet and the outlet near the upper end and one between the inlet and the outlet near the lower end. The convection cell can operate to separate at least a portion of a constituent from the fluid mixture prior to passage of the fluid mixture through the filter. In some instances the filter can include a membrane or a prepacked screen. A bypass can be provided to selectively allow fluid to bypass the filter.

Another illustrative implementation encompasses a fluid separator. The fluid separator includes an elongate receptacle having an inlet operable to receive a fluid mixture. The receptacle is oriented at an angle to horizontal such that gravitational force causes a portion of the fluid mixture to settle to a lower sidewall of the receptacle. That portion of the fluid flows along the lower sidewall to a lower end wall of the receptacle and turns at the lower sidewall to flow along an upper sidewall of the receptacle toward an upper end of the receptacle. The flow along the lower sidewall has a larger amount of a heavy constituent of the fluid mixture than the flow along the upper sidewall.

Yet another illustrative implementation encompasses a method of separating constituents of a fluid mixture. In the method the fluid mixture is received in an elongate receptacle oriented at an acute angle to horizontal such that gravitational force causes a portion of the fluid mixture to settle to a lower sidewall of the elongate receptacle. That portion flows along the lower sidewall to a lower end wall of the elongate receptacle and turns at the lower end wall to flow along an upper sidewall of the elongate receptacle towards an upper end of the receptacle. The flow along the lower sidewall has a larger amount of heavy constituent of the fluid mixture than the flow along the upper sidewall.

An advantage of some implementations is that efficient separation of fluid mixture constituents can be achieved without additional energy input. Gravitational forces can be the primary driver for separation; and therefore there are no operational costs associated with energy input. However, because of the convective flow separation, the implementations perform separation more quickly than traditional separators relying primarily on constituents settling vertically out of the fluid mixture. The convective flow separation also does not require high velocity fluid flow often required by other traditional separators (like cyclonic separators) which often cause formation of inseparable emulsions.

Another advantage of some implementations is that multiple separation vessels can be used in parallel to increase separation capacity. Multiple separation vessels can be used in series to separate multiple constituents of a fluid mixture. The multiple separation vessels can be nested in a space efficient manner.

Another advantage of some implementations is that one or more separation vessels can be used in conjunction with a filter to reduce the filtering load the filter must bear. Such reduced filtering load increases the life of the filter and reduces clogging.

BRIEF DESCRIPTION OF THE DRAWINGS

FIG. 4 is a schematic side cross-sectional view of another illustrative separator constructed in accordance with the invention incorporating a filter.

DETAILED DESCRIPTION

Figure 1:
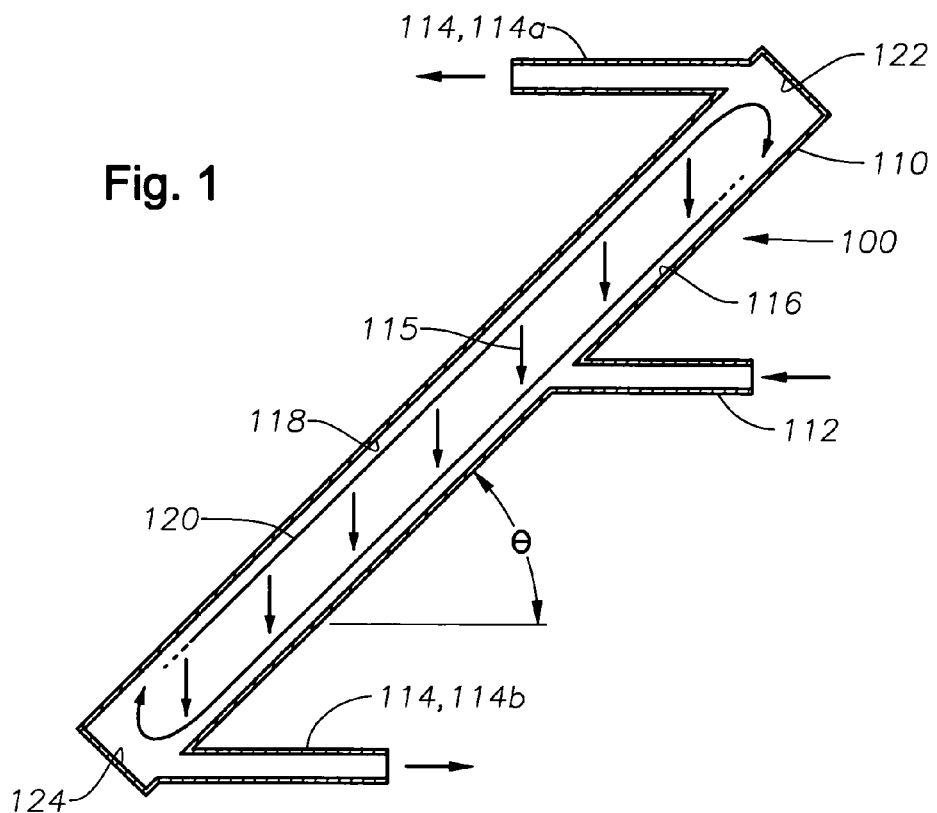
FIG. 1 is a schematic side cross-sectional view of an illustrative separator constructed in accordance with the invention.

Referring first to FIG. 1, an illustrative separator 100 constructed in accordance with the invention includes an elongate vessel 110 oriented with its longitudinal axis at an acute angle θ relative to horizontal. As is discussed in more detail below, the angle θ may be different in different applications. In one instance, angle θ is between about 30° and about 70°. Additionally, as is discussed in more detail below, the length of the vessel 110 is greater than a transverse dimension, for example diameter, of the vessel 110. In one instance, the length of the vessel 110 may be greater than twice or three times the transverse dimension (e.g. diameter). In one instance, the aspect ratio of the vessel 110 is 2:1 or greater.

The vessel 110 can include one or more inlet ports 112 through which a fluid mixture for separation is introduced. The vessel 110 can include one or more outlet ports 114 through which the separated constituent fluids and particulate can be withdrawn. The inlet port 112 and outlet port 114 can be in various different locations. For example, the separator 100 of FIG. 1 includes a light constituent outlet port 114a about an upper end of the vessel 110 and a heavy constituent outlet port 114b about a lower end of the vessel 110. In another instance, the inlet port 112 can be near the bottom of the vessel 110 and the one or more outlet ports 114 can be above the inlet port 112. In yet another instance, the inlet port 112 can be near the top of the vessel 110 and the one or more outlet ports 114 below the inlet port 112.

Although depicted in FIG. 1 as exiting a lateral wall of the vessel 110, the outlet ports 114 may exit the vessel 110 elsewhere. For example, in illustrative separator 200 of FIG. 2A, the outlet ports 114 exit the end walls of the elongate vessel 210. Referring back to FIG. 1, the inlet port 112 is located intermediate the outlet ports 114. Although depicted substantially equidistant between the outlet ports 114, the inlet port 112 may be positioned closer to one or the other ends of the vessel 110.

The illustrative separators described herein are operable in separating one or more constituents of disparate density from a fluid mixture. The fluid mixture can be a mixture of one or more immiscible fluids, as well as a mixture of one or more fluids and solids (e.g. particulate). The constituents of disparate density are referred to herein for convenience of reference as a light constituent and a heavy constituent of the fluid mixture. In one instance, for example in an oilfield application, the separators may be used in separating a fluid mixture of oil and water, where the heavy constituent is water and the light constituent is oil. The separators may be used in separating particulate such as formation fines (e.g. sand) and fracturing proppant from one or more liquids (e.g. oil and water). In use separating particulate from oil and/or water, the heavy constituent is particulate and the light constituent is the oil and/or water. There are many other mixtures of immiscible fluids and mixtures of fluids and solids to which the concepts described herein are applicable. For example, in another instance, such as a beverage manufacturing application, the separators can be used in separating a fluid mixture including orange juice (light constituent) and orange pulp (heavy constituent). Some other examples can include milk and particulate, paint and particulate, and lubrication oil and contaminates.

In operation, the fluid mixture is input through the inlet port 112 into the interior of the vessel 110. By force of gravity, the heavy constituents 115 of the fluid mixture begin to sink substantially vertically downward (substantially parallel to the gravity vector) and collect about lower sidewall 116 of the vessel 110. This sinking or vertically downward flow of heavy constituents 115 occurs substantially throughout the length of the vessel 110. The collecting heavy constituents 115 about the lower sidewall 116 creates a hydrostatic pressure imbalance between the fluid mixture about upper sidewall 118 of the vessel 110 and the fluid mixture about the lower sidewall 116, because of the density differential of the fluid mixtures. As a result, the fluid mixture about the lower sidewall 116, containing a larger portion of heavy constituents 115, begins to travel downward along the lower sidewall 116 and substantially parallel to the longitudinal axis of the vessel 110. The fluid mixture about the upper sidewall 118, containing a smaller portion of heavy constituents 115, correspondingly begins to travel upward along the upper sidewall 118 and substantially parallel to the longitudinal axis of the vessel 110. The result is a convection cell 120 that spans between upper end 122 and lower end 124 of the vessel 110; the convection cell 120 defined by fluid flowing down the lower sidewall 116, turning at the lower end 124 of the vessel 110, flowing up the upper sidewall 118 and turning at the upper end 122 of the vessel 110. In addition to the convection cell 120, the substantially vertically downward flow of heavy constituents 115 continues substantially throughout the vessel 110.

As the fluid mixture containing a larger portion of heavy constituents 115 turns at the lower end 124 of the vessel 110 to flow back upward along the upper sidewall 118, it deposits a portion of the heavy constituents 115 at the lower end 124 of the vessel 110. Therefore, the fluid flowing from the lower end 124, back up the upper sidewall 118 has a reduced portion of heavy constituents 115. The amount of heavy constituents 115 in the flow flowing up from the lower end 124 further decreases as the flow continues back up the upper sidewall 118, because the heavy constituents 115 continue to sink vertically downward (vertically downward flow of heavy constituents 115) and join the flow along the lower sidewall 116. The vertically downward flow of heavy constituents 115 continues, and continues to join the flow along the lower sidewall 116 as the flow continues upward to the upper end 122. No undulations or protrusions are needed on the interior surface of the vessel 110 to turn or otherwise disturb the fluid flow to effect the constituent separation.

The convection cell 120 and the vertically downward flow of heavy constituent 115 operate continuously while fluid is introduced through the inlet port 112. Therefore, the heavy constituents 115 are separated toward the lower end 124 and the light constituents toward the upper end 122. The heavy constituents 115 can be withdrawn through the heavy constituent outlet port 114*b* near the lower end 124 of the vessel 110. Likewise, the light constituents can be withdrawn through the light constituent outlet port 114*a* near the upper end 122 of the vessel 110.

It has been found that an angle of inclination (θ) between about 40-60 degrees produces efficient operation, although other angles also work. Steeper angles are less conducive to convective action, but may still be operable. Shallower angles, likewise may still be operable, but generally need longer sidewalls 116. Putting the increased size of the vessel 110 aside, longer sidewalls 116 also mean more friction; thus reducing effectiveness of the separation.

Because the fluid circulates within the convection cell 120, the separator 100 can separate the constituents of a fluid mixture faster than the heavy constituent 115 can settle vertically downward and out of the light constituent. Furthermore, no energy needs to be input into the system to effect the separation other than the force of gravity. Conventional separators relying solely on the heavy constituents settling vertically downward and out of the light constituents are limited by the terminal velocity of the heavy constituent in the fluid mixture. Once the heavy constituent reaches its terminal downward velocity, the separation cannot occur any faster. The convection cell 120 formed by the separator 100, however, carries the heavy constituent 115 towards the lower end 124 of the vessel 110 at a rate that is faster than the terminal velocity of the heavy constituent 115. Therefore, the heavy constituent 115 is transported to the lower end 124 and separated from the light constituent at a higher rate.

A long, narrow vessel 110 is more efficient at forming a convection cell 120 than a short, wide vessel. The efficiency of a long, narrow vessel 110 stems from the pressure in the axis of the downward flow along the lower sidewall 116 being greater than the pressure in the axis of the vertically downward flow of heavy constituent 115 at the point where the flow along the lower sidewall 116 turns to flow upward. At the lower end 124 of the vessel 110, the downward flow along the lower sidewall 116 turns and flows against the vertically downward flow of heavy constituent 115. To form a convection cell 120, the upward flow from the lower sidewall 116 must overpower the vertically downward flow of heavy constituents 115. As a transverse dimension of the vessel 110 decreases, the hydrostatic pressure differential in the axis of the vertically downward flow of heavy constituents 115 is reduced. Likewise as the length of the vessel 110 increases, the hydrostatic pressure differential in axis of the downward flow along the lower sidewall 116 increases. Therefore, as the ratio of length to width increases, so does the ability of the upward flow from the lower sidewall 116 to overpower the vertically downward flow of the heavy constituent 115. Likewise, as the length increases, the fluid velocity gets higher. This increases friction between the fluid and the walls, and also between the two opposing fluids. Therefore, increases in length, beyond a certain length may not increase the speed of separation. However, increasing the length further would increase the quality or purity of the separation as separation continues throughout the length of the vessel The separator 100 can be configured to be free-standing or linked to other equipment for above-ground or on-seafloor installations. Alternately, the separator 100 can be buried below the Earth's surface. Locating the separator 100 below the Earth's surface not only preserves the surface for other uses, but protects the separator 100 from potential damage that may occur when on the surface. Additionally the separator 100 may be placed inside of a well bore, or located adjacent one or more wells for use in separating a fluid mixture associated with the wells. As an alternative to burying the separator 100, an equivalent structure to one or more of the vessel 110, inlet port 112, and/or outlet ports 114 can be bored into the Earth and used as a separator. Other configurations of separators described herein may also be buried below the Earth's surface or constructed with equivalent structures bored into the Earth.

Figure 2A:
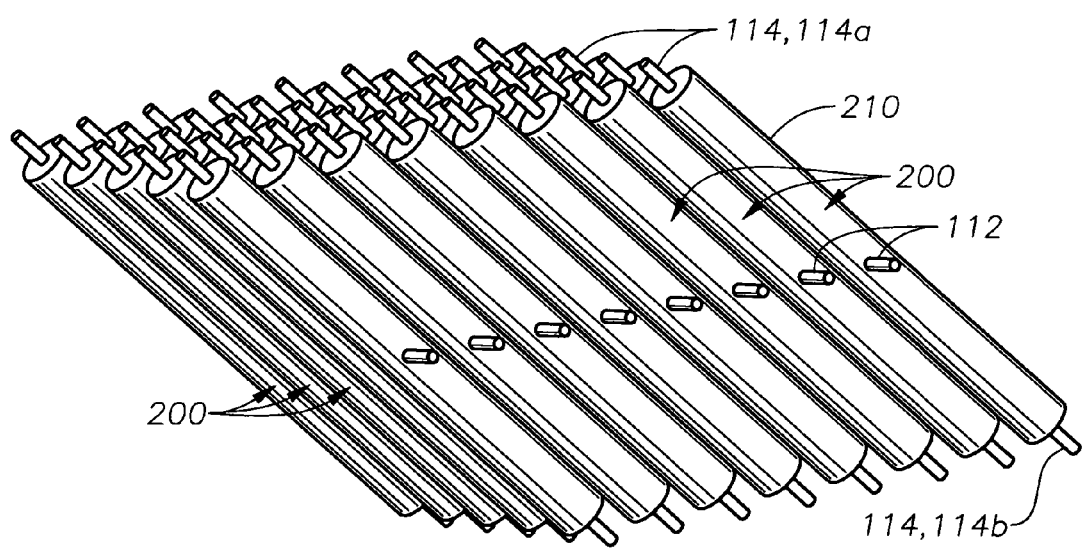
FIG. 2A is a schematic side view of a plurality of illustrative separators constructed in accordance with the invention and arranged in a nested configuration.
Figure 2B:
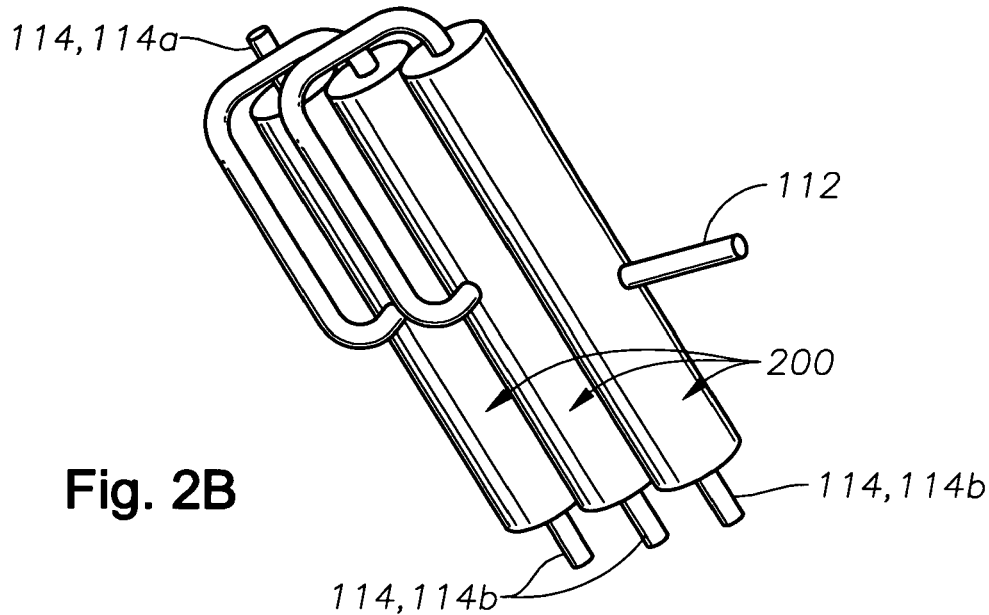
FIG. 2B is a schematic side view of the illustrative separators of FIG. 2A configured in series.
Figure 2C:
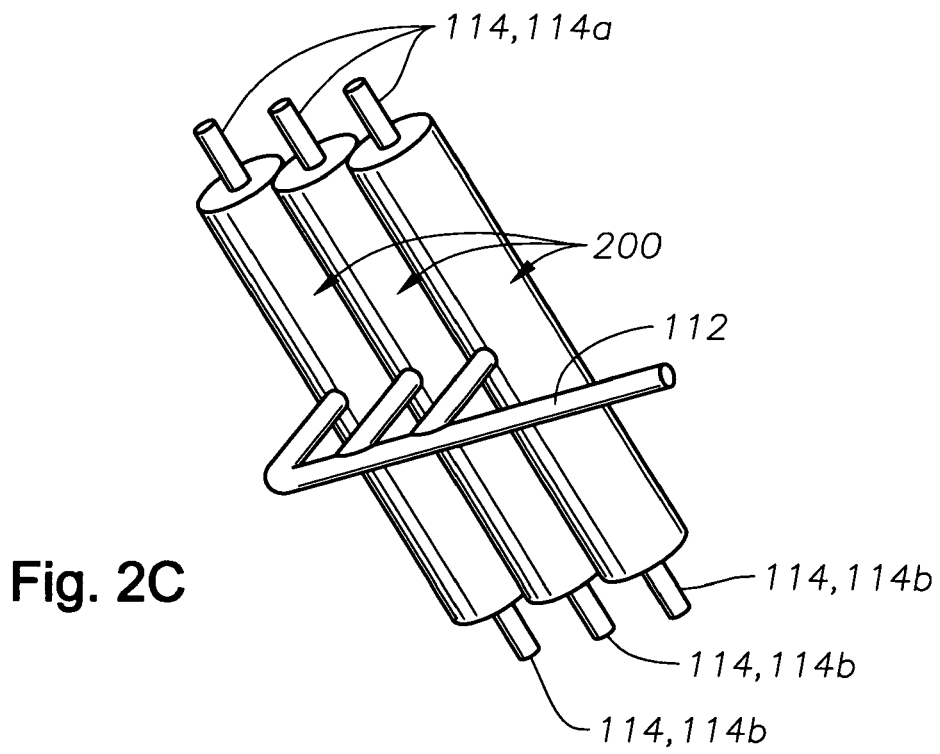
FIG. 2C is a schematic side view of the illustrative separators of FIG. 2A configured in parallel.

FIG. 2A shows a space efficient manner of co-locating two or more separators 200. As is shown in the figure, the separators 200 are substantially linear, and therefore can be placed closely adjacent one another in a nested arrangement. The separators 200 can be arranged to operate in series (FIG. 2B), where an outlet 114 of one separator 200 feeds an inlet 112 of another separator, or the separators 200 can be arranged to operate in parallel (FIG. 2C), where a fluid mixture to be separated is distributed among the inlets 112 of the two or more separators 200. Configuring the separators 200 in series (FIG. 2B) enables further separation of one constituent of a fluid mixture into sub-constituents. For example, a first of two separators 200 in series may separate particulate and water from oil, and the second of the two separators 200 may separate the particulate from the water.

Figure 3B:
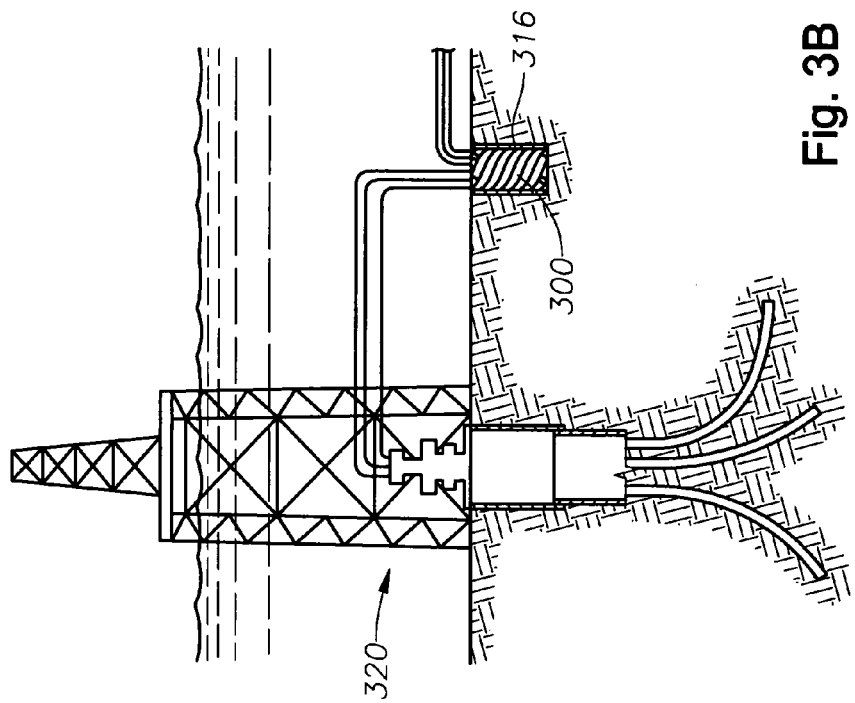
FIG. 3B is a schematic side view of the illustrative separator of FIG. 3A depicted in an illustrative sub-surface application in accordance with the invention.
Figure 3A:
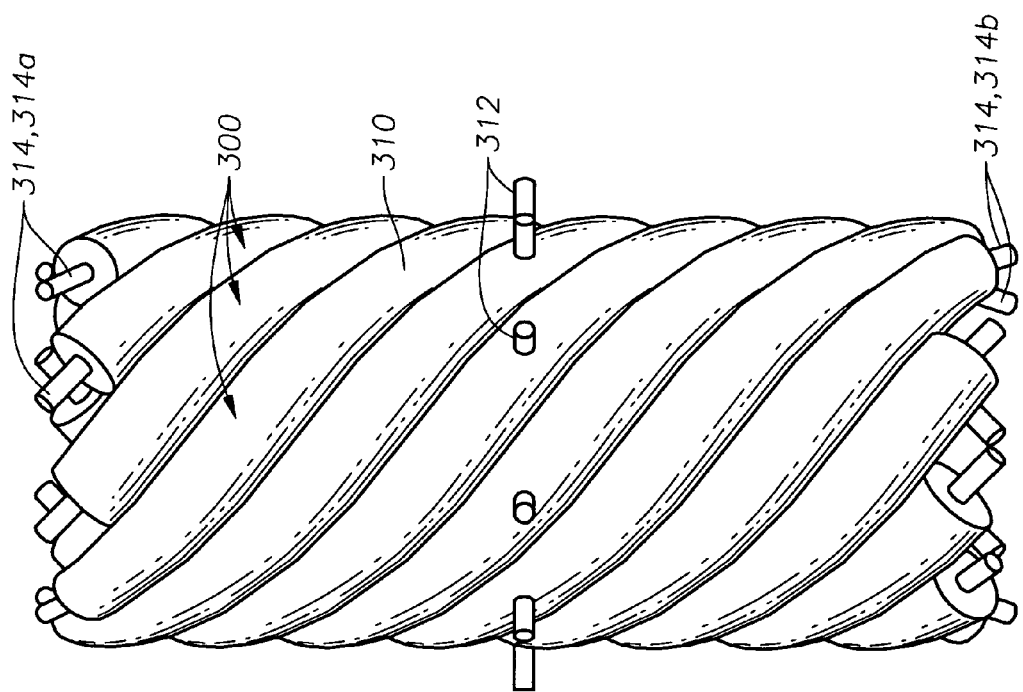
FIG. 3A is a schematic side view of another illustrative separator constructed in accordance with the invention.

FIG. 3A depicts a plurality of alternate illustrative separators 300, each separator 300 substantially helical and configuration. In a similar manner to the substantially linear separators 200 depicted in FIG. 2A, the substantially helical separators 300 of FIG. 3A can be placed closely adjacent one another and a nested arrangement. The separators 300, each have an elongate helical vessel 310 with an inlet port 312 and one or more outlet ports 314, for example a light constituent outlet port 314*a* and a heavy constituent outlet port 314*b*. As is best seen in FIG. 3B, the separators 300 configured in a nested arrangement are suited for placement within a cylindrical body, such as the conductor casing 316 at or near a subsea wellhead 320.

Turning now to FIG. 4, another alternate illustrative separator 400 incorporates a filter 426. The separator 400 is operable to separate the heavy and light constituents of a fluid mixture by establishing a convection cell 420 as is described above with reference to FIG. 1. However, rather than being the primary separation mechanism, as above, the convection cell 420 in the separator 400 operates to initially separate the heavy and light constituents of the fluid mixture prior to filtration of a portion of the fluid mixture by the filter 426. By operating to initially separate the heavy constituents of the fluid mixture prior to filtration by the filter 426, the convection cell 420 reduces the filtering load on the filter 426. The reduced filtering load on the filter 426 reduces clogging and prolongs the life of the filter 426.

The separator 400 includes an elongate vessel 410 having an inlet port 412 and one or more outlet ports 414, for example a light constituent outlet port 414*a* and a heavy constituent outlet port 414*b*. As above, the light constituent outlet port 414*a* may be positioned about an upper end 422 of the vessel 410 and the heavy constituent outlet port 414*b* may be positioned about a lower end 424 of the vessel 410. In one illustrative implementation, the filter 426 may be a membrane that spans, at least partially, across an interior of the vessel 410. Gaps (not specifically shown) may be provided in the filter 426 to allow passage of fluid if the filter 426 becomes blocked. In one implementation the filter 426 may be an ionically treated porous membrane that may also or alternatively be a molecularly sized porous membrane. The filter 426 may be positioned above or below the inlet port 412. In the configuration of FIG. 4, the filter 426 is positioned below the inlet port 412 and oriented to span the interior of the vessel 410 at a diagonal. One instance where it may be desirable for the filter 426 to be positioned below the inlet port 412 is a configuration where the filter 426 filters the light constituent and passes the heavy constituent. For example, the filter 426 may be oil philic and hydrophobic to filter oil from water and pass the water. One instance where it may be desirable for the filter 426 to be positioned about the inlet port 412 is a configuration where the filter 426 filters the heavy constituent and passes the light constituent. For example, the filter 426 may be a fine mesh that filters particulate from water and/or oil.

Operation of the separator 400 is similar to the separator 100 of FIG. 1 above in that a fluid mixture is introduced through the inlet port 412, heavy constituent 415 sinks substantially vertically downward (vertically downward flow of heavy constituent 415) toward lower sidewall 416 and begins convection cell 420 of a fluid mixture containing a larger portion of heavy constituent 415 flowing downward along the lower sidewall 416 and a fluid mixture containing the remaining light constituent and a lesser portion, if any, of the heavy constituent 415 flowing upward along upper sidewall 418. The fluid mixture containing a larger portion of heavy constituent 415 flows down the lower sidewall 416 and through the filter 426. As the fluid mixture flowing down the lower sidewall 416 and through the filter 426 contains a lesser portion of the light constituent, the amount of the light constituent that the filter 426 must remove is less. Accordingly the filter 426 is less prone to clogging with light constituent and will last longer than if the filter 426 is used alone without the convection cell 420.

In a configuration where the filter 426 is adapted to filter the heavy flow and pass the light flow, for example in a configuration where the filter 426 is positioned above the inlet port 412, the flow entering the filter 426 has a smaller portion of the heavy constituent 415, thereby reducing clogging with heavy constituent 415 and increasing the life of the filter 426.

Figure 5:
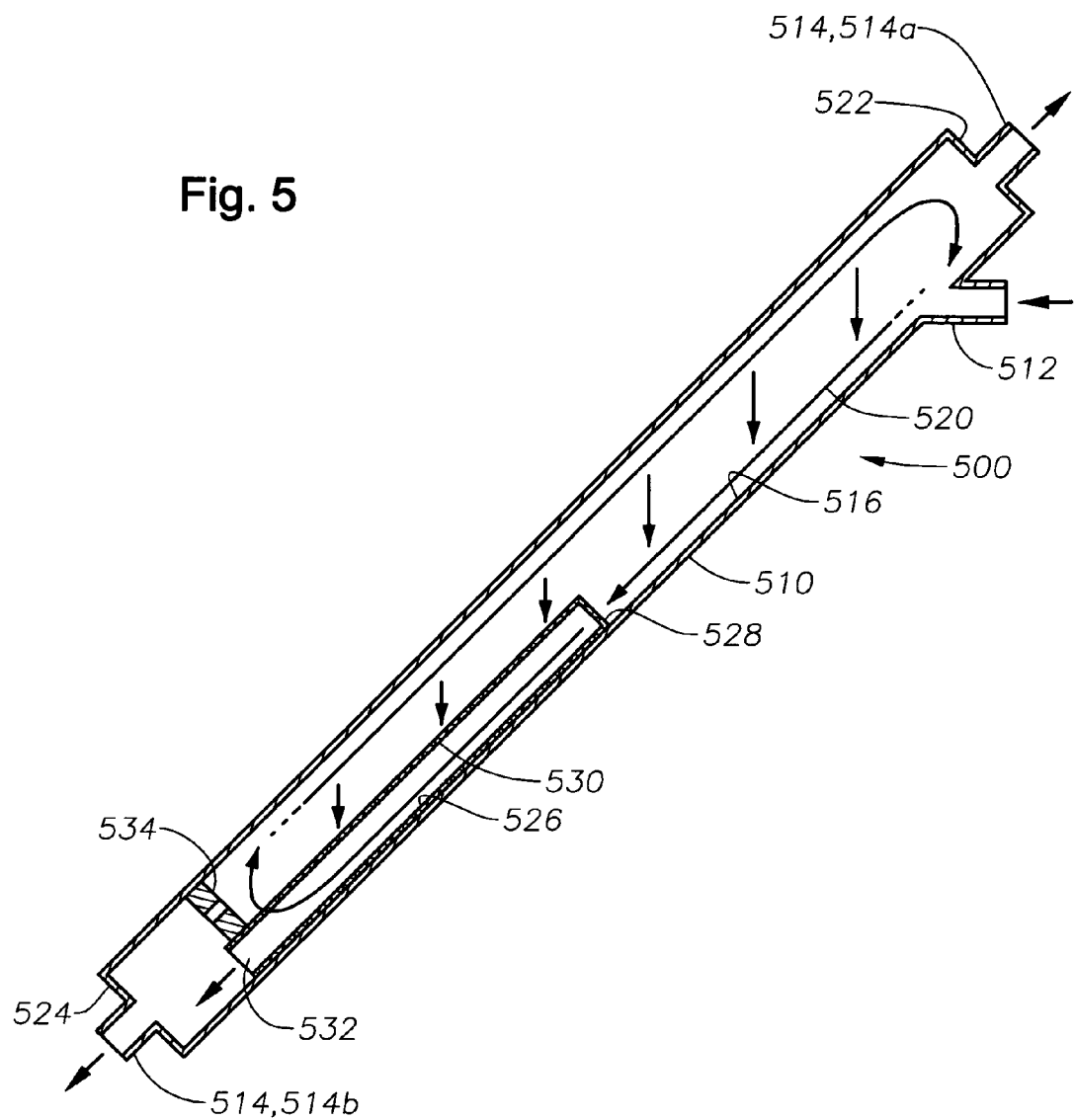
FIG. 5 is a schematic side cross-sectional view of another illustrative separator incorporating a filter constructed in accordance with the invention.

The concepts described herein are not limited to use of a membrane type filter 426. Rather, numerous other types of filters can be used, including but not limited to capillary filters, centrifuges, cyclones, and others. For example, FIG. 5 depicts another alternate illustrative separator 500 that incorporates a prepacked screen as a filter 526. A prepacked screen is a screen that carries filter media, for example a particulate media such as sand, operable to filter a constituent from the fluid mixture. In an instance of filtering oil from water, the filter media can be sand that is treated to be hydrophobic and thereby pass water and filter oil. As above, the separator 500 is configured to form a convection cell 520 that operates to initially separate the heavy and light constituents of the fluid mixture prior to filtration of a portion of the fluid mixture by the filter 526. The filter 526 may be positioned above or below the inlet port 512. Additionally, the vessel 510 may include one or more outlet ports 514, for example a light constituent outlet port 514a about an upper end 522 of the vessel 510 and a heavy constituent outlet port 514b about a lower end 524 of the vessel 510.

The filter 526 is cylindrical in configuration and resides adjacent lower sidewall 516 of the vessel 510. Because the filter 526 resides adjacent the lower sidewall 516, the fluid mixture entering the filter 526 contains a larger portion of the heavy constituent. The fluid mixture enters through an upper end wall 528 and/or a lateral sidewall 530 of the filter 526, passes axially through the filter 526, and exits about a lower end 532 of the filter 526. The filter 526 can also be used in conjunction with a bypass mechanism 534, for example a choke or pressure limiting valve, to allow passage of the fluid mixture should be filter 526 become plugged or otherwise stopped.

Although several illustrative implementations of the invention have been described in detail above, those skilled in the art will readily appreciate that many other variations and modifications are possible without materially departing from the concepts described herein. Accordingly, other implementations are intended to fall within the scope of the invention as defined in the following claims.

What is claimed is:

1. A device for separating constituents of a fluid mixture, comprising an elongate vessel oriented at an acute angle to horizontal, wherein:
   the vessel is operable to receive the fluid mixture through an inlet port and direct the fluid mixture to convectively flow in a convection cell spanning substantially a length of the vessel;
   the convection cell is formed by gravitational forces acting on the fluid mixture; and
   the convection cell is operable to deposit a heavy constituent of the fluid mixture about a lower end of the vessel and a light constituent of the fluid mixture about an upper end of the vessel,
   wherein the acute angle to horizontal is between about 30° and about 70°; and
   wherein the disposition of the inlet port is selected from the group consisting of at an acute angle to the vessel and in a plane coaxial the axis of rotation of the convective flow.

2. The device of claim 1 further comprising a first outlet about the upper end and a second outlet about the lower end.

3. The device of claim 2 further comprising an inlet between the first and second outlets.

4. The device of claim 3 further comprising a filter residing at least partially between the inlet and the first outlet or at least partially between the inlet and the second outlet.

5. The device of claim 4 wherein the filter is adapted to pass water and filter oil.

6. The device of claim 1 further comprising a filter, wherein the convection cell operates to separate at least a portion of a constituent from the fluid mixture prior to passage of the fluid mixture through the filter.

7. The device of claim 6 wherein the filter comprises at least one of a membrane or a prepacked screen.

8. The device of claim 7 further comprising a bypass adapted to selectively allow fluid to bypass the filter.

9. The device of claim 1 further comprising a second elongate vessel oriented at an acute angle to horizontal, wherein:
   the second vessel is operable to receive a fluid mixture output from the first mentioned vessel and direct the fluid mixture output to flow in a convection cell spanning substantially a length of the second vessel; and
   the second vessel is operable to deposit a heavy constituent of the fluid mixture output about a lower end of the second vessel.

10. The device of claim 9 wherein the first mentioned vessel and the second vessel are substantially helical and nested with one another.

11. The device of claim 9 wherein the first mentioned vessel and the second vessel are substantially linear and nested with one another.

12. The device of claim 1 further comprising a second elongate vessel oriented at an acute angle to horizontal, wherein the second vessel is operable to receive a portion of the fluid mixture.

13. The device of claim 1, wherein the acute angle to the vessel is between about 30° and about 70°.

14. A fluid separator, comprising an elongate receptacle having an inlet operable to receive a fluid mixture, wherein:
the receptacle is oriented at an angle to horizontal such that gravitational force causes a portion of the fluid mixture to settle to a lower sidewall of the receptacle, flow along the lower sidewall to a lower end wall of the receptacle, and turn at the lower end wall to flow along an upper sidewall of the receptacle toward an upper end of the receptacle; and
the flow along the lower sidewall has a larger amount of a heavy constituent of the fluid mixture than the flow along the upper sidewall,
wherein the angle to horizontal is between about 30° and about 70°; and
wherein the inlet is disposed one of at an acute angle to the elongate receptacle or in a plane coaxial with axis of rotation of the fluid mixture.

15. The fluid separator of claim 14 further comprising an outlet about the upper and operable to output a portion of the fluid mixture containing less heavy constituent than the fluid mixture introduced through the inlet.

16. The fluid separator of claim 14 further comprising a filter residing at least partially between the inlet and the upper end or at least partially between the inlet and the lower end.

17. The fluid separator of claim 14 wherein the receptacle is an elongate cavity formed in the Earth adjacent a well.

18. The fluid separator of claim 14 wherein a length to width aspect ratio of the receptacle is at least about 2:1.

19. The device of claim 14, wherein the acute angle is between about 30° and about 70°.

20. A method of separating constituents of a fluid mixture, comprising receiving the fluid mixture through an inlet port in an elongate receptacle oriented at an acute angle to horizontal such that gravitational force causes a portion of the fluid mixture to settle to a lower sidewall of the receptacle, flow along the lower sidewall to a lower end wall of the receptacle, and turn at the lower end wall to flow along an upper sidewall of the receptacle toward an upper end of the receptacle, wherein the flow along the lower sidewall has a larger amount of a heavy constituent of the fluid mixture than the flow along the upper sidewall,
wherein the acute angle to horizontal is between about 30° and about 70°; and
wherein the inlet port is disposed one of at an acute angle to the elongate receptacle or in a plane coaxial with axis of rotation of the fluid mixture.

21. The method of claim 20 further comprising withdrawing a portion of the fluid mixture from the upper end, wherein the withdrawn portion has less heavy constituent than the fluid mixture initially received in the receptacle.

22. The method of claim 20 further comprising withdrawing a portion of the fluid mixture from a lower end of the receptacle, wherein the withdrawn portion has more heavy constituent than the fluid mixture initially received in the receptacle.

23. The method of claim 20 further comprising filtering a constituent from at least one of the portion of the fluid mixture flowing along the lower sidewall or the portion of the fluid mixture flowing along the upper sidewall.

24. The method of claim 23 wherein filtering the constituent comprises filtering oil from the fluid mixture flowing along the lower sidewall.

25. The method of claim 23 wherein filtering the constituent comprises passing the portion of the fluid mixture through at least one of an ionically treated membrane, a molecularly sized porous membrane, or a prepacked screen.

26. The method of claim 20 further comprising:
withdrawing a portion of the fluid mixture from at least one of the upper end or the lower end of the receptacle; and
receiving the portion of the fluid mixture in a second elongate receptacle oriented at an acute angle to horizontal such that gravitational force causes a portion of the fluid mixture to settle to a lower sidewall of the second receptacle, flow along the lower sidewall of the second receptacle to a lower end wall of the second receptacle, and turn at the lower end wall of the second receptacle to flow along an upper sidewall of the second receptacle toward an upper end of the second receptacle, wherein the flow along the lower sidewall of the second receptacle has a larger amount of a heavy constituent of the fluid mixture than the flow along the upper sidewall of the second receptacle.

* * * * *